(12) United States Patent
Jobe et al.

(10) Patent No.: US 6,886,580 B2
(45) Date of Patent: May 3, 2005

(54) FROST PROOF VALVE

(76) Inventors: David Jobe, 12 Station Road, Matamata (NZ); Robin Jobe, 32 Rata Street, Matamata (NZ)

( * ) Notice: Subject to any disclaimer, the term of this patent is extended or adjusted under 35 U.S.C. 154(b) by 54 days.

(21) Appl. No.: 10/270,518

(22) Filed: Oct. 16, 2002

(65) Prior Publication Data

US 2003/0205275 A1 Nov. 6, 2003

(30) Foreign Application Priority Data

May 1, 2002 (NZ) ................................................ 518674

(51) Int. Cl.⁷ ........................... A01K 7/04; F16K 24/02; F16K 31/34; F16K 31/365
(52) U.S. Cl. ............................. 137/59; 119/78; 119/80; 137/414; 137/486; 137/487.5; 251/46; 251/61.4
(58) Field of Search ...................... 119/78, 80; 251/45, 251/46, 61.3, 61.4, 61.5; 137/2, 4, 5, 59, 62, 93, 413, 414, 446, 486, 487.5, 554, 312; 700/46, 266, 281, 282, 285, 299, 300

(56) References Cited

U.S. PATENT DOCUMENTS

| | | | | |
|---|---|---|---|---|
| 1,302,538 A | * | 5/1919 | Gulick | 137/413 |
| 3,592,212 A | * | 7/1971 | Schleimer | 137/93 |
| 4,068,677 A | * | 1/1978 | De Steur et al. | 137/93 |
| 4,105,186 A | * | 8/1978 | Eby | 251/46 |
| 4,273,146 A | * | 6/1981 | Johnson | 137/5 |
| 4,277,343 A | * | 7/1981 | Paz | 137/5 |
| 4,505,450 A | * | 3/1985 | Saarem et al. | 251/46 |
| 4,508,136 A | * | 4/1985 | Kah, Jr. | 251/46 |
| 4,816,987 A | * | 3/1989 | Brooks et al. | 137/487.5 |
| 5,062,446 A | * | 11/1991 | Anderson | 137/487.5 |
| 5,113,892 A | * | 5/1992 | Hull et al. | 137/62 |
| 5,340,468 A | * | 8/1994 | Hawthorne et al. | 137/93 |
| 5,487,404 A | * | 1/1996 | Kerger | 137/446 |
| 5,687,098 A | * | 11/1997 | Grumstrup et al. | 137/487.5 |
| 5,887,609 A | * | 3/1999 | Garretson | 137/414 |
| 6,035,878 A | * | 3/2000 | Adams et al. | 137/487.5 |
| 6,077,444 A | * | 6/2000 | Peltzer | 137/5 |
| 6,382,226 B1 | * | 5/2002 | Larson et al. | 137/486 |
| 6,510,368 B1 | * | 1/2003 | Beardwood et al. | 137/93 |
| 6,595,236 B2 | * | 7/2003 | Herlihy | 137/414 |

FOREIGN PATENT DOCUMENTS

NZ          129413          5/1962

* cited by examiner

*Primary Examiner*—George L. Walton
(74) *Attorney, Agent, or Firm*—Lowe Hauptman & Berner LLP.

(57) ABSTRACT

The present invention relates to a valve assembly for use in below freezing conditions which includes a valve housing with a connection to a supply of fluid, and a primary chamber, and a secondary chamber, and a flexible diaphragm, and an equalisation port, and a safety port the valve assembly characterised in that has a safety port associated with the secondary chamber wherein the safety port is configured to have a lower flow-rate than that through the equalisation port.

22 Claims, 2 Drawing Sheets

FROST PROOF VALVE

TECHNICAL FIELD

The present invention relates to fluid control valves.

In particular, this invention relates to fluid control valves that are used in locations that are subject to temperatures below the freezing point of water.

Reference throughout the specification should now be made to the use of the present invention in relation to float operated water control valves for use in water troughs. However, this should not be seen to be a limitation on the present invention in any way as the present invention may be used to control the flow of any fluid in conditions where the temperature may drop below the freezing point of the fluid.

BACKGROUND ART

The present invention has been developed primarily for use in an agricultural environment for the control of water flow to a water trough that is intended for the use of livestock throughout the year, even in environmental conditions where frost or ice may form.

Most commercially available bowls or animal water troughs are fairly standard in their construction, the vast majority of these being float operated valves wherein a float is connected to a lever that in turn bears against the valve member.

The water level within the trough controls the position of the float which in turn controls the position of the lever. The position of the float control lever either allows the valve head to bear against the valve seat and thus restrict the flow of fluid or displaces the valve head away from the valve seat in order to allow fluid flow through the valve assembly.

There are numerous variations upon this theme due to the simplicity of this arrangement.

The simplicity of this arrangement has a number of advantages, not only the ease and simplicity of its construction, but also the fact that it can allow a rugged design which has few components that could malfunction in the harsh outdoor farming environment that it is anticipated that the valves will be utilised in.

Whilst these types of valves are relatively effective in most conditions, particularly the new more sophisticated variations, such as the applicant's own valve sold locally under the trade mark of "MEGAFLOW" in which the supply is filtered prior to going through the valve as this not only improves the quality of the water but also minimizes the risk of particles of detritus damaging or blocking the valve itself.

Several float operated valves, including the applicant's own "MEGAFLOW" valve rely on pressure equalisation either side of a flexible diaphragm to shut off the flow of fluid through the valve when the fluid level within the trough has reached the desired level.

These types of valves also include a small passage connecting either side of the diaphragm in order that a volume of water may flow past the diaphragm in order to achieve pressure equalization.

Whilst these types of valve system are generally trouble free, the vagaries of the environment can cause them problems, as if the temperature drops below the frost point (or freezing point) then these valves will ice up—which not only causes a cease of fluid flow into the trough but also means that due to the ice swelling within the valve there can be a degree of damage caused to the valve components or the valve housing itself.

In worse cases this freezing of the valve will cause the valve housing to split or the valve components themselves to be damaged so that when the ice is no longer present the valve will not function correctly resulting in either no water flowing through the valve or the valve being unable to terminate the water flow when required.

This therefore places a restriction on the use of these valves and either means that animals need to be enclosed in a shelter during periods of inclement weather—which is not only expensive but quite often impractical, or another means of manually providing water for the animals has to be employed.

Therefore an automatic system for controlling the water level within a trough during periods where the external temperature drops below frost point (or freezing point) is required.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a valve assembly including;

a valve housing with a connection to a supply of fluid, and a primary chamber, and a secondary chamber, and a flexible diaphragm, and an equalisation port, and a safety port characterised in that the valve assembly includes a safety port associated with the secondary chamber wherein the safety port is configured to have a lower flow-rate than that through the equalization port.

In preferred embodiments of the present invention the valve assembly includes a float operated valve for a water trough that utilises a flexible diaphragm to turn on and off the flow of water from the fluid inlet to the fluid outlet.

This should not be seen to be limiting on the present invention in any way as in other embodiments the valve assembly can be any valve assembly that is needed to stay operational if it has been, or is, exposed to temperatures below the freezing point of the fluid passing through the valve assembly.

It should be understood that within the present specification the term "primary chamber" should be understood to mean a void within the valve housing that is between the fluid inlet and the flexible diaphragm.

Also within the present specification the term "secondary chamber" should be understood to mean a void within the valve housing that is separated from the primary chamber by the flexible diaphragm and the equalisation port.

It should be understood that throughout the present specification the term "flexible diaphragm" should be understood to mean a flexible membrane that is located between the primary and secondary chambers and that in operation is deflected to allow the flow of fluid from the primary chamber to the fluid outlet.

It should also be understood that the term "equalisation port" used within the present specification should be understood to mean an aperture that connects the primary and secondary chambers in order to allow a controlled volume of fluid to flow from the primary chamber into the secondary chamber in order to equalize the pressure either side of the flexible diaphragm when the valve is closed.

Throughout the present specification the term "safety port" should be understood to mean any aperture that is in the valve housing, or connected to the valve housing that allows fluid to seep from the valve assembly at a lower flow-rate than that through the equalization port.

It should be appreciated that the safety port of the present invention can be located in any position upon the valve assembly that allows the seepage of fluid in a manner that will not impede or degrade the operation of the valve.

In preferred embodiments of the present invention the safety port is configured so that the fluid seeping from the safety port is channelled away from any moving parts of the valve to ensure that the seeped fluid is unable to effect the operation of the valve assembly even if the seeped fluid was to freeze after exiting the safety port.

It should be appreciated that in some embodiments of the present invention a safety port can be configured so that it can be used as an interface in order that an assembly may be connected to the fluid within the secondary chamber of the valve.

In some preferred embodiments of the present invention the safety port is configured to accept an assembly for monitoring the conditions within the valve or of the fluid within the valve.

Examples of some of the conditions that can be monitored via the safety port are as follows: the waters pH, hardness, the presence of minerals within the water, temperature of the fluid, whether the valve is in the open or closed position, the flowrate of the fluid in the valve and whether there is any fluid within the valve.

Although in preferred embodiments of the present invention a safety port is used to allow a seepage of fluid from the valve to ensure the valve does not freeze or become impaired due to the fluid within it dropping below it's freezing point, it should also be appreciated that in some embodiments a safety port may be fitted with any of the above assemblies in order to monitor and/or control the flow of fluid or the system in which the valve is fitted.

It can clearly be seen that the present invention has many advantages over the valve systems currently available. One significant advantage is that the present invention can be used in areas where the temperature drops below the freezing point of water.

Another advantage of the present invention is that due to it being able to work in inclement conditions it will allow farmers in these locations to have the choice of whether or not to house their animals or let them loose in the paddocks as they are confident they will continue to have a supply of water.

A further significant advantage of the present invention is that due to its durability in hostile conditions it will reduce the need for the operator of the valves to maintain or repair valves due to the damage caused by ice or ice crystals within the valve.

A further advantage of the present invention is that due to it being able to withstand these hostile conditions there is less likelihood of the valve freezing in the open position and therefore causing an unnecessary wastage of water and this will in turn ensure that there are lower running costs for the operator in areas where water is paid for by the volume used.

Another advantage of the present invention is that the embodiments where an assembly is attached to a safety port for the monitoring of parameters of the fluid, not only will the monitoring or changing of these parameters be far more straight forward but it will also ensure that the supply does not need to be interrupted for fitting and/or removal of measuring or controlling the equipment.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

With reference to the figures there is illustrated a frost proof valve generally indicated by arrow 1.

The frost proof valve (1) consists of a valve housing (2) and (3) that when fitted together hold the flexible diaphragm (4) in position.

Figure 1:
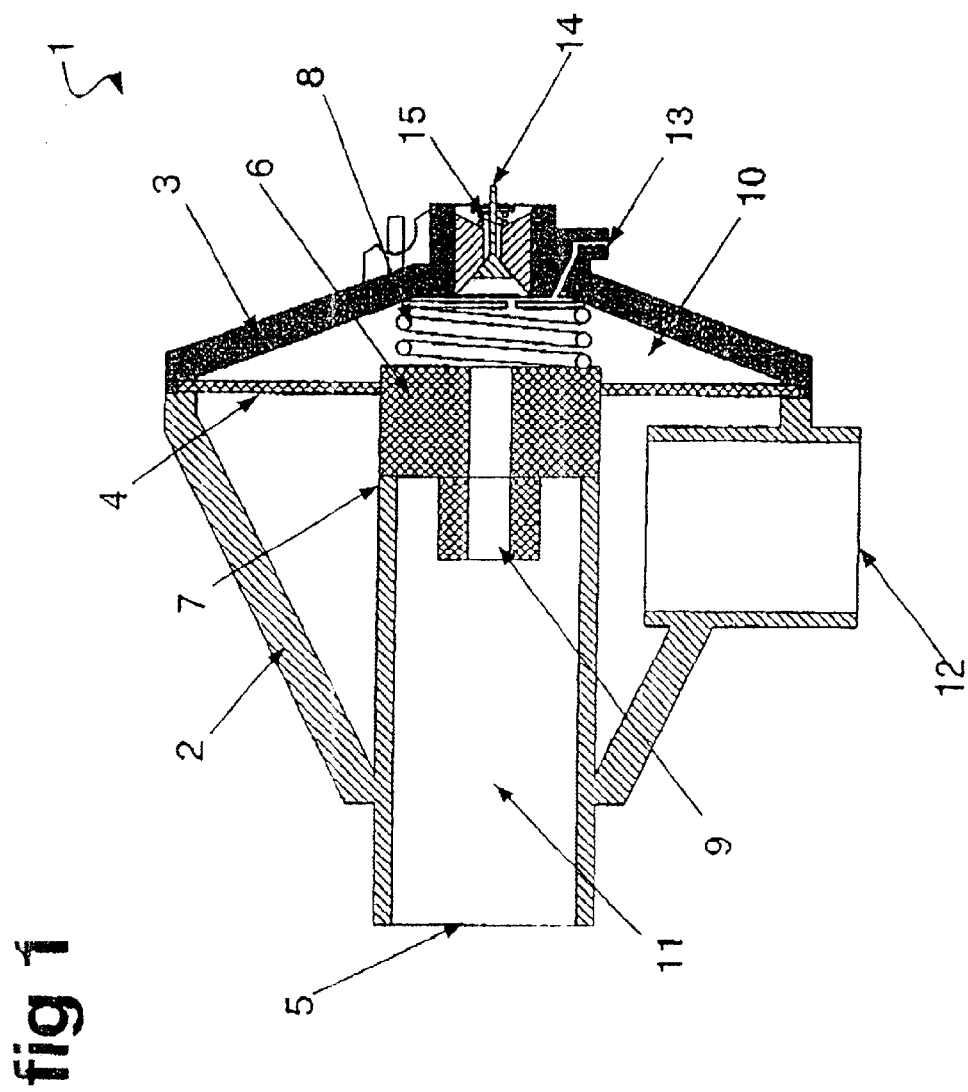
FIG. 1 is a diagrammatical cross sectional view of one preferred embodiment of the present invention in the 'closed' position.
Figure 2:
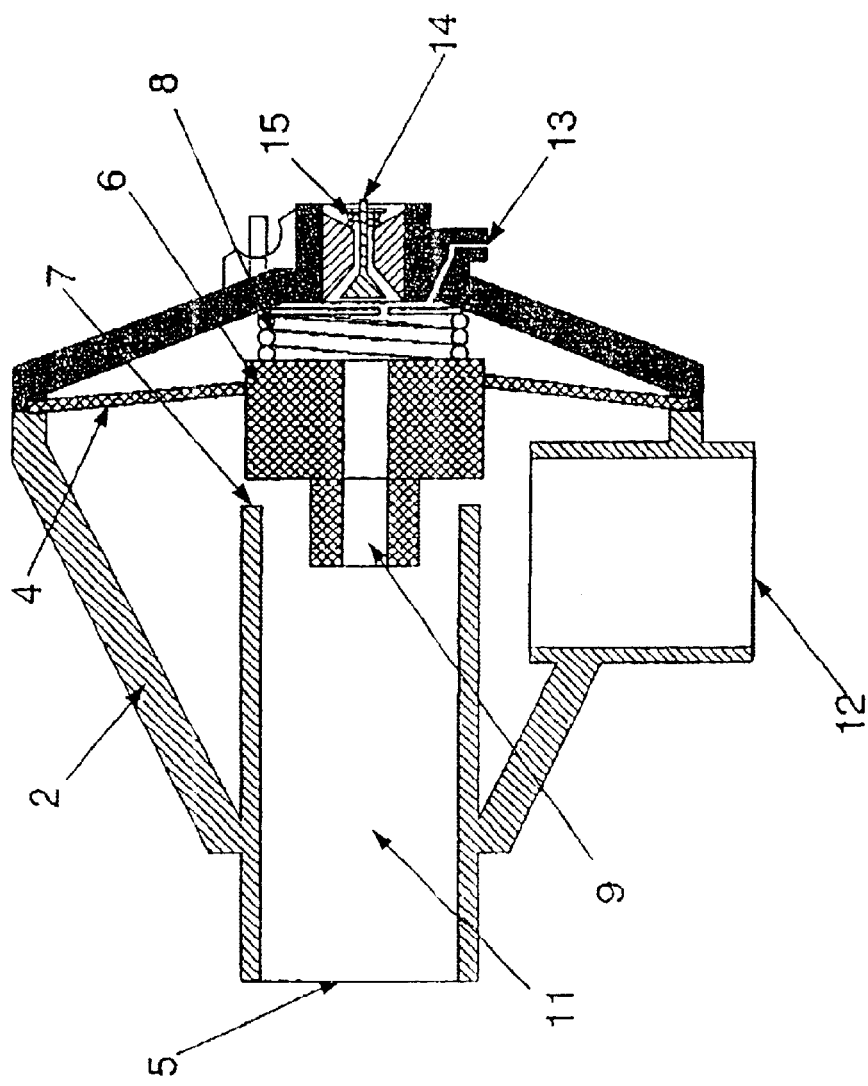
FIG. 2 is a diagrammatical cross sectional view of one preferred embodiment of the present invention in the 'open' position.

FIG. 1 shows the valve (1) in its closed position, wherein the inlet valve head (6) (that is connected to the flexible diaphragm) is held firmly against the inlet valve seat (7) under the action of its biasing assembly (8).

When the frost proof valve (1) is in its closed position the equalisation port (9) ensures that the pressure within the secondary chamber (10) is equal to the pressure within the primary chamber (11). This ensures that the fluid pressure within the primary chamber (11) does not keep the valve head (6) separated from the valve seat (7) as this would allow fluid to flow from the fluid inlet (5) to the fluid outlet (12).

When the frost proof valve (1) is in either its open or closed position there is a fluid flow from the fluid inlet (5) to the safety valve (13) via the equalisation port (9) and the secondary chamber (10) in order to ensure that there is a small but constant flow of fluid through the valve (1) so that fluid will not freeze within the internal structure of the valve (1) as this could stop the operation of the valve (1) or damage the actual structure of the valve (1) components.

When the fluid level within the trough (or whatever container the frost proof valve is fitted to control) drops below the required level the float actuator arm (not illustrated for clarity) pushes against the float actuator valve (14) to overcome the biasing means (15) that keeps the valve closed, in order to allow the flow of fluid through the valve (14) until the level within the container is high enough to raise the float until the float actuator arm no longer pushes against the float actuator valve (14).

Once the float actuator arm has depressed the float actuator valve (14) then fluid from the secondary chamber (10) flows out past the float actuator valve (14) which results in a drop of pressure within the secondary chamber (10).

As soon as the drop of pressure in the secondary chamber (10) is great enough to overcome biasing means (8) the valve head (6) will be forced away from the valve seat (7) due to the pressure within the fluid inlet (11). This will allow a flow of fluid from the fluid inlet (5) through the primary chamber (11) to exit the frost proof valve (1) through the fluid outlet (12).

During periods of inclement weather it is imperative that the fluid supply does not freeze up, or in the case of water contain ice crystals, as this can seriously impair the operation of the valve (1) due to ice crystals either jamming the valve assembly (1) in an open, partially open or closed position. Therefore the inclusion of the safety valve (13) is imperative.

The safety valve (13) allows a volume of the supply fluid to flow from the secondary chamber (10) of the valve (1) at all times in order to ensure a turnover of fluid within the valve (1) as this will reduce the likelihood of ice crystals forming at any point within the valve assembly (1).

Although these drawings show the valve assembly (1) fitted with an integral safety valve (13) this need not always be the case and item (13) should also be understood to represent a safety port that allows access to the fluid within the secondary chamber (10) through the channel within the port (13). The safety port (13) could be used to secure any suitable assemblies that require access to the fluid within the secondary chamber (10) in order to measure or adjust some of the fluid parameters.

Aspects of the present invention have been described by way of example only and it should be appreciated that modifications and additions may be made thereto without departing from the scope of the appended claims.

What we claim is:

1. A valve assembly, comprising:
    a valve housing connectable to a supply of fluid,
    a flexible diaphragm dividing an internal space of said valve housing into a primary chamber having a fluid inlet and outlet, and a secondary chamber having a safety port,
    an equalization port communicating the fluid from the primary chamber to the secondary chamber, and
    a safety port configured with an aperture from the secondary chamber to the outside of the valve housing to allow a continuous seepage of fluid from the valve to ensure the valve does not freeze;
    wherein the safety port associated with the secondary chamber is configured to have a non-zero flow-rate lower than that through the equalization port.

2. A valve assembly in accordance with claim 1, wherein the safety port is configured so that the fluid seeping from the safety port is channeled away from any moving parts of the valve assembly.

3. A valve assembly in accordance with claim 2, wherein said moving parts are not positioned in the safety port.

4. A valve assembly in accordance with claim 1, wherein the safety port communicates the secondary chamber with an outside of said secondary chamber at all times, whereby the fluid within the secondary chamber is allowed to seep from the valve assembly at all times.

5. A valve assembly, comprising:
    a valve housing connectable to a supply of fluid;
    a flexible diaphragm dividing an internal space of said valve housing into a primary chamber having a fluid inlet and outlet, and a secondary chamber having a safety port;
    an equalization port communicating the fluid from the primary chamber to the secondary chamber;
    a safety port, wherein the safety port associated with the secondary chamber is configured to have a lower flow-rate than that through the equalization port; and
    a sensor inserted into the fluid in the secondary chamber, via the safety port, for monitoring or controlling at least one parameter of the fluid within the valve assembly.

6. A valve assembly in accordance with claim 5, wherein said sensor is adapted to monitor the pH of the fluid.

7. A valve assembly in accordance with claim 5, wherein said sensor is adapted to monitor the hardness of the fluid, which is water, in the valve assembly.

8. A valve assembly in accordance with claim 5, wherein said sensor is adapted to monitor the presence of minerals within the fluid of the valve assembly.

9. A valve assembly in accordance with claim 5, wherein said sensor is adapted to monitor the temperature of the fluid within the valve assembly.

10. A valve assembly in accordance with claim 5, wherein said sensor is adapted to monitor the flow rate of the fluid in the valve assembly.

11. A valve assembly in accordance with claim 5, wherein said sensor is adapted to monitor the presence or lack of presence of the fluid within the valve assembly.

12. A valve assembly in accordance with claim 5, wherein said sensor comprises a pressure sensor monitoring the pressure of the fluid within the secondary chamber.

13. A valve assembly, comprising:
    a valve housing connectable to a supply of fluid;
    a flexible diaphragm dividing an internal space of said valve housing into a primary chamber having a fluid inlet and outlet, and a secondary chamber having a safety port,
    an equalization port communication the fluid from the primary chamber to the secondary chamber;
    a safety port, wherein the safety port associated with the secondary chamber is configured to have a lower flow-rate than that through the equalization port; and
    a sensor inserted into the fluid in the secondary chamber, via the safety port, for monitoring the position of the valve assembly from its open to its closed position.

14. A valve assembly, comprising:
    a valve housing having a fluid inlet, a fluid outlet, and a safety port;
    a flexible diaphragm dividing an internal space of said valve housing into a primary chamber having said fluid inlet and outlet, and a secondary chamber having said safety port;
    an equalization port communicating a fluid from the primary chamber to the secondary chamber;

wherein
the safety port is configured to have a lower flow rate than the equalization port; and
the safety port communicates the secondary chamber with an outside of said valve housing at all times, whereby fluid within the secondary chamber is allowed to seep from the valve assembly at all times to prevent freezing.

15. A valve assembly in accordance with claim 14, further comprising an inlet valve head, said inlet valve head being moveable, due to flexibility of said flexible diaphragm, between a first position, at which the fluid inlet is communicated with the fluid outlet to allow the fluid to flow from the fluid inlet to the fluid outlet through the valve assembly, and a second position, at which the fluid inlet is isolated from the fluid outlet to prevent the fluid from flowing from the fluid inlet to the fluid outlet;
wherein the fluid is allowed to flow from the fluid inlet through the equalization port, to the secondary chamber, through the safety port, to the outside of said valve housing at all times, without affecting movements of the inlet valve head between the first and second positions.

16. A valve assembly in accordance with claim 15, wherein said inlet valve head is moved from the second position to the first position when a pressure difference between a first pressure of the primary chamber and a second pressure of the secondary chamber reaches a predetermined level.

17. A valve assembly in accordance with claim 16, wherein the flow rate of said safety port, through which the fluid flows from the fluid inlet through the equalization port, to the secondary chamber to the outside of said valve housing, does not cause the pressure difference to reach said predetermined level.

18. A valve assembly in accordance with claim 17, wherein said secondary chamber further comprises
an opening other than said safety port, said opening communicating said secondary chamber with the outside of said valve housing; and
a valve selectively closing said opening;
wherein a flow rate of said opening, when said opening is open by said valve, is sufficient to cause the pressure difference to reach said predetermined level.

19. A valve assembly in accordance with claim 18, wherein the safety port is configured so that the fluid seeping from the safety port is channeled away from all moving parts of the valve.

20. A valve assembly in accordance with claim 14, wherein said secondary chamber further comprises
an opening other than said safety port, said opening communicating said secondary chamber with the outside of said valve housing; and
a valve selectively closing said opening.

21. A valve assembly in accordance with claim 20, further comprising a sensor inserted into the secondary chamber, via the safety port, for monitoring the position of the inlet valve head.

22. A valve assembly in accordance with claim 14, further comprising a sensor inserted into the secondary chamber, via the safety port, for monitoring at least one selected from the group consisting of the pH, the hardness, the presence of minerals, the temperature, the flow rate and the presence or lack of presence of the fluid within the valve assembly.

* * * * *